May 5, 1931. L. A. TAYLOR 1,804,289
SOUND RECORDING
Filed Jan. 31, 1930
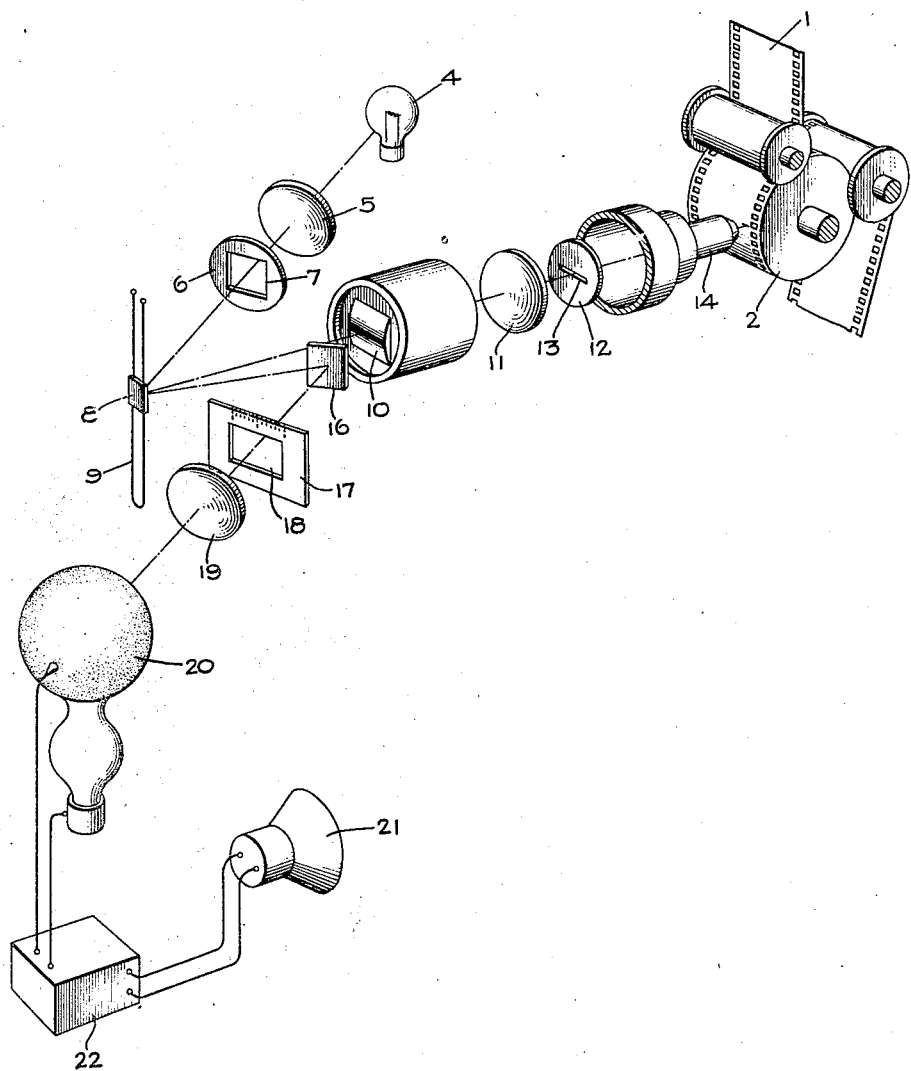
Inventor:
Laurens A. Taylor,
by Charles E. Tullar
His Attorney.

Patented May 5, 1931

1,804,289

UNITED STATES PATENT OFFICE

LAURENS A. TAYLOR, OF SCHENECTADY, NEW YORK, ASSIGNOR TO GENERAL ELECTRIC COMPANY, A CORPORATION OF NEW YORK

SOUND RECORDING

Application filed January 31, 1930. Serial No. 424,992.

My invention relates to apparatus for photographically recording sound, and an object of my invention is the provision in apparatus of this character of improved means for monitoring the recording operation.

My invention will be better understood from the following description taken in connection with the accompanying drawing, and its scope will be pointed out in the appended claims.

Referring to the drawing in which the single figure shows in a diagrammatic manner one embodiment of my invention, the sensitive film upon which the sound is to be recorded is shown at 1 as being supported on the surface of the rotatable drum 2. The sound may be recorded on the film either in accordance with the variable intensity method or the variable width method. In the present illustration I have chosen to show well known means for making a record of the variable width type employing an oscillograph galvanometer of which only the moving portion is shown. This means comprises the light source 4, lens 5, stop 6 having opening 7, galvanometer mirror 8 mounted on the conductor loop 9 of the galvanometer, the cylindrical lens 10, lens 11, stop 12 having the aperture or slit 13 therein, and objective 14. The vibration of the mirror 8 in accordance with the sound waves causes the concentrated reflected light beam to illuminate more or less of the aperture 13 in stop 12. Objective 14 focuses a reduced image of the illuminated portion of aperture 13 on the film. The two vertical edges of the opening 7 in stop 6 give the light beam two opposite sharply defined working edges. When there is no sound the galvanometer is usually adjusted to bring one of those edges approximately at the middle of aperture 13. A certain portion of the beam reflected by the mirror always passes to one side of the cylindrical lens 10 and since it does not reach the film is in effect lost. In accordance with my invention, I make use of this unused portion of the light beam for monitoring purposes and by so doing enable the operator to obtain a true indication of the operation of the pick-up, the amplifying apparatus and the galvanometer without in any way interfering with the making of the record.

At a point between the mirror and the cylindrical lens 10, preferably close to the latter, I mount the mirror 16 in such a position that it will reflect that part of the light beam which would not reach the film but will not intercept any of the light which otherwise would reach the film. In the path of the light reflected by mirror 16 I place the stop 17 having the opening 18 therein through which most of the light passes. The upper portion of the stop 17 is provided with a scale by means of which the amplitude of vibration of the reflected beam can be read off. The length of the opening 18 is much greater than the width of the sound track and the distance between mirror 16 and stop 17 is such that the movement of the beam engaging the stop is greater in the same proportion than the movement of the beam engaging the film. By observing the amplitude of vibration of the beam directed on the stop the operator may become aware of and guard against any overshooting of the limits of the sound track by the recording beam. Observation of the vibration amplitude is facilitated by reason of the fact that that portion of the beam reflected by the galvanometer mirror has one of the two working edges mentioned above, this edge, when there is no sound, extending across the middle of the opening 18. The light which passes through the opening 18 is collected by the lens 19 and is received by the photo-electric cell 20. A sound producing device suitable for monitoring purposes such for example as the loud speaker 21 is connected through a suitable thermionic amplifier 22 with the terminals of the cell 20. With the above proportionality between beam movements, length of stop and width of the sound track, overshooting of the sound track not only may be observed but the effect thereof may be heard in the loud speaker.

In making a sound record with this apparatus the operator is able to monitor the operation of the various elements of the recording mechanism from the sound pick-up to the variable exposing light both audibly and visually and this without any sacrifice in the efficiency of the recording apparatus.

What I claim as new and desire to secure by Letters Patent of the United States is:—

1. Apparatus for recording sound on a moving light sensitive member comprising a light source, means for laterally vibrating a beam of light from said source in accordance with sound waves, means whereby the light comprising one portion of said beam may expose said member, monitoring means, and means arranged to direct the light comprising another portion of said beam toward said monitoring means and to cause a magnification of the movement thereof.

2. Apparatus for recording sound on a moving light sensitive member comprising a light source, means for laterally vibrating a beam of light from said source in accordance with sound waves, a member having an opening therein through which a portion of the vibrated beam passes to said light sensitive member, a monitoring device, and a mirror arranged to reflect toward said device a portion of the vibrated beam normally not passing said opening.

3. Apparatus for recording sound on a moving light sensitive member comprising a light source, means for vibrating a beam of light from said source transverse of said moving member in accordance with sound waves, means by which a portion of said vibrated beam is used to expose said light sensitive member, and monitoring apparatus comprising visual and audible indicating means arranged to be operated by a portion not used to expose the light sensitive member.

4. Apparatus for recording sound on a moving film comprising a light source, a mirror responsive to sound waves for vibrating a beam of light from said source transversely of said film, means for focusing a portion of the vibrated beam on the film, means for deflecting another portion of the vibrated beam, and monitoring apparatus arranged to be affected by said other portion, said apparatus comprising means for visually indicating the amplitude of the recorded sound and means for audibly indicating the quality thereof.

5. Apparatus for recording sound on a moving film comprising a light source, a mirror responsive to sound waves for vibrating a beam of light from said source transversely of said film, a stop between the mirror and the film having a narrow aperture therein, means for imaging said aperture on the film, a second stop having a scale thereon and an opening therein, a mirror arranged to reflect on said second stop a portion of the vibrated beam not used for recording on the film, a photo-electric cell arranged behind the aperture in said stop and a sound producer connected with said cell.

6. Apparatus for recording sound on a moving film comprising a light source, a mirror responsive to sound waves for vibrating a beam of light from said source transversely of said film, a stop between the mirror and the film having a narrow aperture therein, means for imaging said aperture on the film, a second stop having a scale thereon and an opening therein, a mirror arranged to reflect on said second stop a portion of the vibrated beam not used for recording on the film, a photo-electric cell arranged behind the opening in said second stop, and a sound producer connected with said cell, the apparatus being so constructed and arranged that the movement of the beam engaging said second stop and the length of the opening in said stop are proportional to the movement of the film exposing beam and the width of the sound track.

In witness whereof, I have hereunto set my hand this 30th day of January, 1930.

LAURENS A. TAYLOR.